US010212561B2

(12) United States Patent
Kung et al.

(10) Patent No.: US 10,212,561 B2
(45) Date of Patent: Feb. 19, 2019

(54) MESSAGE TRANSMISSION SYSTEM, RECEIVING APPARATUS, RECEIVING METHOD AND COMPUTER-READABLE RECORDING MEDIUM THEREOF

(71) Applicant: Future Sync Int'l Ltd., Taipei (TW)

(72) Inventors: Hsiang-Che Kung, Taipei (TW); Yu-Lee Horng, Taipei (TW); Ching-Wei Yang, Taoyuan (TW); Ernest Chung-Ching Chen, New Tapei (TW); Yu-Heng Lo, Kaohsiung (TW)

(73) Assignee: Future Sync Int'l Ltd., Taipei (TW)

( * ) Notice: Subject to any disclaimer, the term of this patent is extended or adjusted under 35 U.S.C. 154(b) by 0 days.

(21) Appl. No.: 16/006,856

(22) Filed: Jun. 13, 2018

(65) Prior Publication Data

US 2018/0359615 A1    Dec. 13, 2018

(30) Foreign Application Priority Data

Jun. 13, 2017    (TW) .............................. 106208552 U

(51) Int. Cl.
| | | |
|---|---|---|
| *H04W 4/12* | (2009.01) | |
| *H04W 68/02* | (2009.01) | |
| *H04L 29/06* | (2006.01) | |
| *H04L 29/08* | (2006.01) | |
| *H04W 4/06* | (2009.01) | |

(52) U.S. Cl.
CPC ........... *H04W 4/12* (2013.01); *H04L 65/4076* (2013.01); *H04L 67/26* (2013.01); *H04W 4/06* (2013.01); *H04W 68/02* (2013.01)

(58) Field of Classification Search
CPC .......... H04W 4/06; H04W 4/12; H04W 68/02
See application file for complete search history.

(56) References Cited

U.S. PATENT DOCUMENTS

| 8,856,027 B2 | 10/2014 | Khunteta | |
|---|---|---|---|
| 2014/0038512 A1* | 2/2014 | Yang | H04W 4/06 |
| | | | 455/3.01 |

FOREIGN PATENT DOCUMENTS

| CN | 103793833 | 5/2014 |
|---|---|---|
| TW | M538196 | 3/2017 |

* cited by examiner

*Primary Examiner* — Keith Ferguson
(74) *Attorney, Agent, or Firm* — JCIPRNET

(57) ABSTRACT

A message transmission system, a receiving apparatus, a receiving method and a computer-readable recording medium thereof are provided. The message transmission system includes a transmitting apparatus, a receiving apparatus and a database. The transmitting apparatus transmits a broadcasting message, where the broadcasting message includes an identification code. The receiving apparatus forwards the identification code in response to receiving the broadcasting message. The database provides an intent content corresponding to the identification code without an application identification. The receiving apparatus presents a notification according to the intent content by an operation system (OS) without opening an application corresponding to the application identification in response to receiving the intent content. Accordingly, without installing an application for receiving a push message, the receiving apparatus still can receive the notification, and efficiency of push notification can be improved.

20 Claims, 4 Drawing Sheets

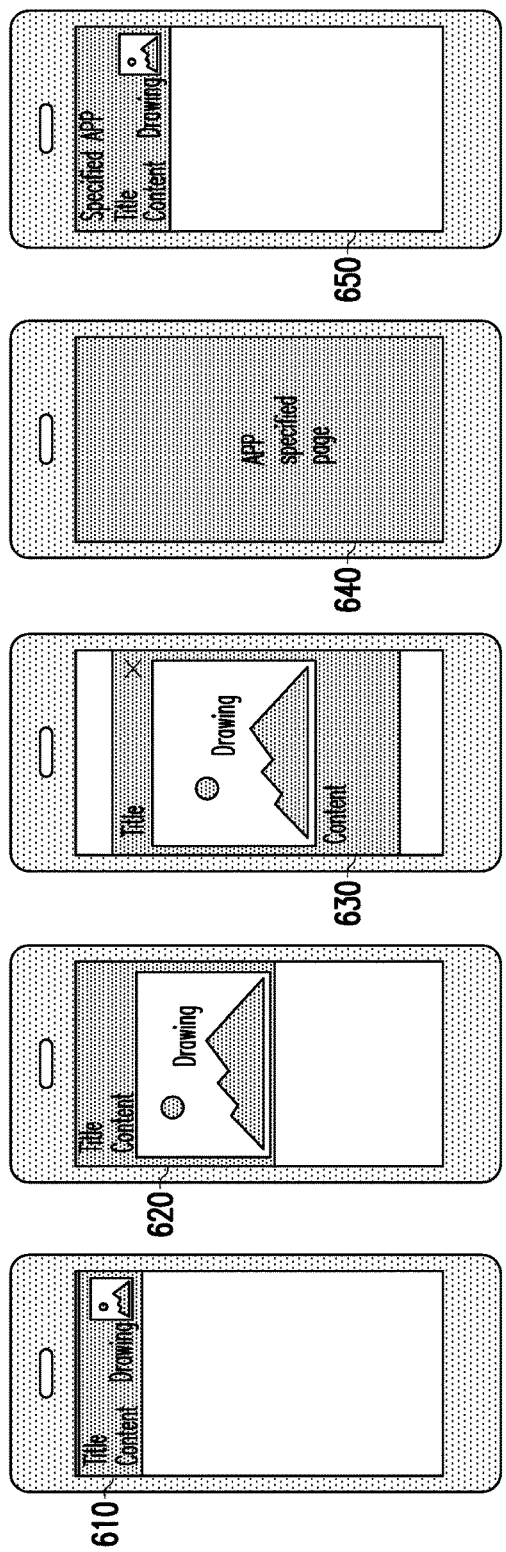

MESSAGE TRANSMISSION SYSTEM, RECEIVING APPARATUS, RECEIVING METHOD AND COMPUTER-READABLE RECORDING MEDIUM THEREOF

CROSS-REFERENCE TO RELATED APPLICATION

This application claims the priority benefit of Taiwan application serial no. 106208552, filed on Jun. 13, 2017. The entirety of the above-mentioned patent application is hereby incorporated by reference herein and made a part of this specification.

BACKGROUND OF THE DISCLOSURE

1. Field of the Disclosure

The present disclosure relates to push notifications, and more particularly, relates to a message transmission system, a receiving apparatus, a receiving method and a computer-readable recording medium thereof.

2. Description of Related Art

Smart phones, tablets, and other handheld devices are popular nowadays. Various applications, functions and services are developed for those devices. For example, push notification is one of widely used functions in the handheld devices. The handheld device may subscribe some topics from a server. Then, when a trigger event relating to the subscribed topic occurs, the server would transmit a push message to the handheld device, so that the handheld device can display a notification according to the push message. The trigger event is not only initiated by the server but also by the handheld device or other devices. For example, the handheld device can activate Bluetooth function to receive a broadcasting message with small data size from an iBeacon transmitter, and the handheld device can retrieve more information from the server by a content request according to the broadcasting message. However, the handheld device has to be installed with a corresponding application to receive a specific push notification. It is inconvenient for some users who are not familiar with the operation of the handheld device. In addition, for those who set the iBeacon transmitter to broadcasting messages, their broadcasting messages may not be received by all handheld devices which pass by the iBeacon transmitter. Accordingly, the conventional message transmission manner can be improved.

SUMMARY OF THE DISCLOSURE

Accordingly, the present disclosure is directed to a message transmission system, a receiving method, a receiving method and a computer-readable recording medium thereof, which improves efficiency of push notification.

In one of the exemplary embodiments, the message transmission system at least includes, but not limited to, a transmitting apparatus, a receiving apparatus and a database. The transmitting apparatus transmits a broadcasting message, where the broadcasting message includes an identification code. The receiving apparatus forwards the identification code in response to receiving the broadcasting message. The database provides an intent content corresponding to the identification code without an application identification. The receiving apparatus presents a notification according to the intent content by an operating system (OS) without opening an application corresponding to the application identification in response to receiving the intent content.

According to one of the exemplary embodiments, the database disables appending the application identification with the intent content, and the application identification corresponds to the identification code.

According to one of the exemplary embodiments, the OS monitors the broadcasting message without the application.

According to one of the exemplary embodiments, the transmitting apparatus transmits the broadcasting message comprising a second identification code different from the identification code or transmits a second broadcasting message comprising the second identification code.

According to one of the exemplary embodiments, the identification code corresponds to a push time, the second identification code corresponds to a second push time different from the push time, and the database provides the intent content corresponding to the identification code and the second identification code according to the push time and the second push time, respectively.

According to one of the exemplary embodiments, the broadcasting message further comprises a service enabling indication, and the receiving apparatus activates a push service according to the service enabling indication, to monitor a push message from the database, wherein the push message comprises the intent content.

According to one of the exemplary embodiments, the transmitting apparatus communicates with the receiving apparatus through Bluetooth, Wi-Fi, infrared radiation (IR), or long range (LoRa).

In one of the exemplary embodiments, the receiving apparatus includes a receiver, a presenting device and a processor. The receiver receives a broadcasting message, where the broadcasting message comprises an identification code. The processor is coupled to the receiver and the presenting device. The processor is configured to perform the following steps. Forwarding the identification code to a database in response to receiving the broadcasting message. Obtaining an intent content corresponding to the identification code without an application identification from the database. Presenting a notification according to the intent content by an OS through the presenting device without opening an application corresponding to the application identification in response to obtaining the intent content.

According to one of the exemplary embodiments, the processor monitors the broadcasting message through the OS without the application, and the application identification corresponds to the identification code.

According to one of the exemplary embodiments, the receiver receives the broadcasting message comprising a second identification code different from the identification code or receives a second broadcasting message comprising the second identification code.

According to one of the exemplary embodiments, the identification code corresponds to a push time, the second identification code corresponds to a second push time different from the push time, and the processor obtains the intent content corresponding to the identification code and the second identification code according to the push time and the second push time, respectively.

According to one of the exemplary embodiments, the broadcasting message further comprises a service enabling indication, and the processor activates a push service according to the service enabling indication, to monitor a push message from the database, wherein the push message comprises the intent content.

According to one of the exemplary embodiments, the receiver receives the broadcasting message through Bluetooth, Wi-Fi, IR, or LoRa.

In one of the exemplary embodiments, the receiving method, which is adapted for a receiving apparatus, is provided. The receiving method includes the following steps. Forwarding the identification code to a database in response to receiving the broadcasting message. Obtaining an intent content corresponding to the identification code without an application identification from the database. Presenting a notification according to the intent content by an OS without opening an application corresponding to the application identification in response to obtaining the intent content.

According to one of the exemplary embodiments, the step of obtaining the intent content corresponding to the identification code without an application identification from the database includes the following step. Monitoring the broadcasting message through the OS without the application, wherein the application identification corresponds to the identification code.

According to one of the exemplary embodiments, the step of receiving a broadcasting message includes the following step. Receiving the broadcasting message comprising a second identification code different from the identification code or receiving a second broadcasting message comprising the second identification code.

According to one of the exemplary embodiments, the identification code corresponds to a push time, the second identification code corresponds to a second push time different from the push time, and the step of obtaining the intent content includes the following step. Obtaining the intent content corresponding to the identification code and the second identification code according to the push time and the second push time, respectively.

According to one of the exemplary embodiments, the broadcasting message further includes a service enabling indication, and the step of obtaining the intent content includes the following step. Activating a push service according to the service enabling indication, to monitor a push message from the database, wherein the push message comprises the intent content.

According to one of the exemplary embodiments, the step of receiving a broadcasting message includes the following step. Receiving the broadcasting message through Bluetooth, Wi-Fi, IR, or LoRa.

In one of the exemplary embodiments, the non-transitory computer readable recording medium records computer program to be loaded by a processor to execute the aforementioned method.

To make the above features and advantages of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 6A-6E are examples illustrating different types of notifications.

DESCRIPTION OF THE EMBODIMENTS

Figure 1:
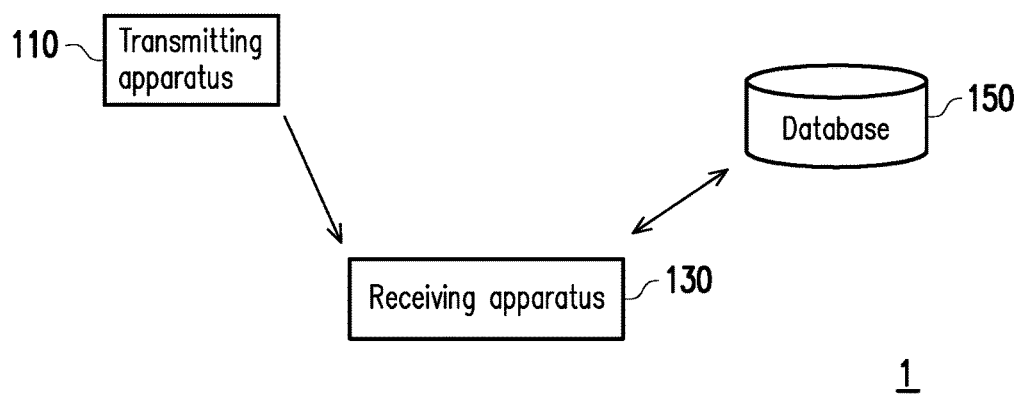
FIG. 1 is a block diagram illustrating a message transmission system according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram illustrating a message transmission system 1 according to one of the exemplary embodiments of the disclosure. The message transmission system 1 at least includes, but not limited to, one or more transmitting apparatuses 110, one or more receiving apparatuses 130 and a database 150.

The transmitting apparatus 110 could be an iBeacon transmitter, a Bluetooth transmitter, a Wi-Fi transmitter, an infrared radiation (IR) emitter, a long range (LoRa) transmitter, a near-field communication (NFC) tag, or a transmitter supporting other communication technologies.

Figure 2:
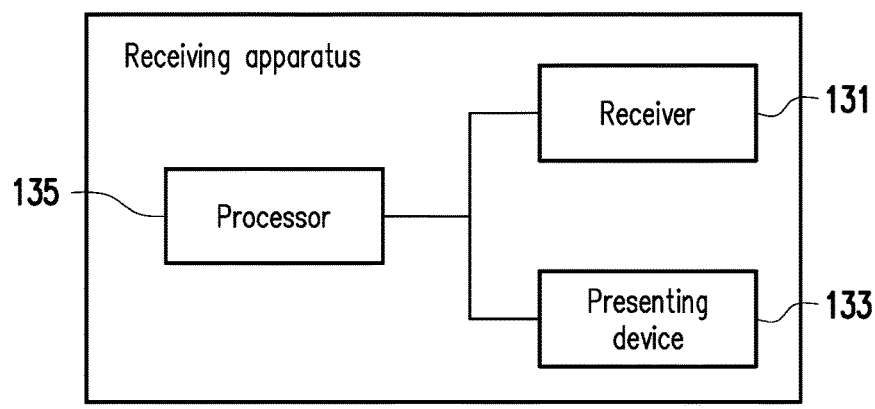
FIG. 2 is a block diagram illustrating a receiving apparatus according to one of the exemplary embodiments of the disclosure.

The receiving apparatus 130 could be a smart phone, a tablet, a notebook, a handheld game console, a wearable device, a smart TV, a smart appliance, or the like. FIG. 2 is a block diagram illustrating a receiving apparatus according to one of the exemplary embodiments of the disclosure. Referring to FIG. 2, the receiving apparatus 130 at least includes, but not limited to, a receiver 131, a presenting device 133 and a processor 135.

The receiver 131 could be a Bluetooth receiver, a Wi-Fi receiver, an IR receiver, a LoRa receiver, an NFC receiver, or a receiver supporting other communication technologies. It should be noticed that, the communication technology used by the receiver 131 would be compatible with the transmitting apparatus 110, so as to receive and parse messages from the transmitting apparatus 110.

The presenting device 133 could be a display (such as a liquid crystal display (LCD), light emitting diode (LED), organic light emitting diode (OLED), or other type of display), a speaker, or other device capable of presenting image, audio and/or video data.

The processor 135 is coupled to the receiver 131 and the presenting device 133. The processor 135 may be implemented by using a programmable unit, such as a central processing unit (CPU), a micro-processor, a micro-controller, a digital signal processing (DSP) chip, a field programmable gate array (FPGA), and so on. The function of the processor 135 may also be implemented by an independent electronic device or an integrated circuit (IC), and the operation of the processor 135 may also be implemented by software. The processor 135 is programmed to execute the functions or steps that would be described below.

The database 150 could be in an internal memory (e.g., a fixed or a movable random-access memory (RAM), a read-only memory (ROM), a flash memory in any form, etc.), residing in a server, a workstation, a desktop computer or a notebook. Alternatively, entire/some parts or functionalities of the database 150 may reside in the receiving apparatus 130. It should be noticed that, based on type of the database 150, the receiving apparatus 130 may communicate with database 150 through a corresponding transmission interface (e.g., universal series bus (USB), memory bus, peripheral component interconnect (PCI), etc.) or a communication transceiver (supporting, for example, Wi-Fi, Bluetooth, etc.).

In order to make the operation process of the embodiment of the disclosure more comprehensible, several embodiments are provided below to describe in detail the operations of the message transmission systems 1 in the embodiment of the disclosure.

Figure 3:
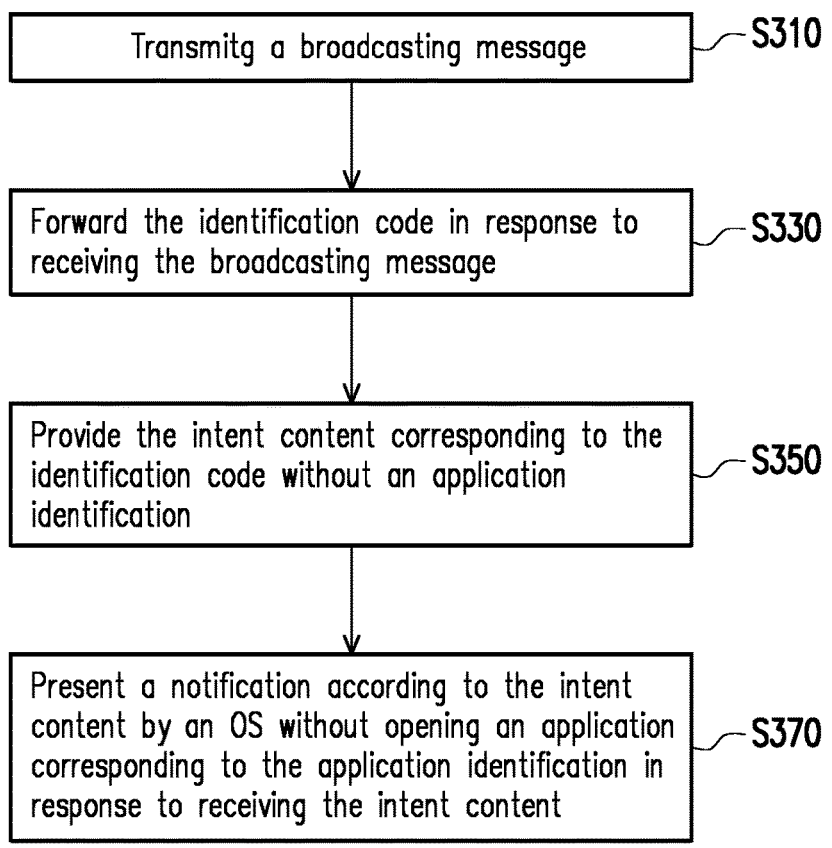
FIG. 3 is a flowchart illustrating a receiving method according to one of the exemplary embodiments of the disclosure.

FIG. 3 is a flowchart of a receiving method according to one of exemplary embodiments of the disclosure. Referring to FIG. 3, the receiving method of this embodiment is adapted for the message transmission systems 1 of FIG. 1 and the receiving apparatus of FIG. 2. Nevertheless, the processes of this receiving method may be adjusted according to the actual needs and thus are not limited to the following.

The transmitting apparatus 110 transmits a broadcasting message (Step S310). The broadcasting message may include one or more identification codes. In this embodiment, the broadcasting message is not specified for specific receiving apparatus 130, any specific receiving apparatus 130 having compatible receiver 131 can receive the broadcasting message. It should be noticed that, the transmitting apparatus 110 might transmit one broadcasting message per second, more broadcasting messages per second, one broadcasting message per several seconds, or each broadcasting message in a desirable temporal pattern. In some embodiments, the broadcasting message may further include signal strength, battery information, region, etc.

Figure 4A:
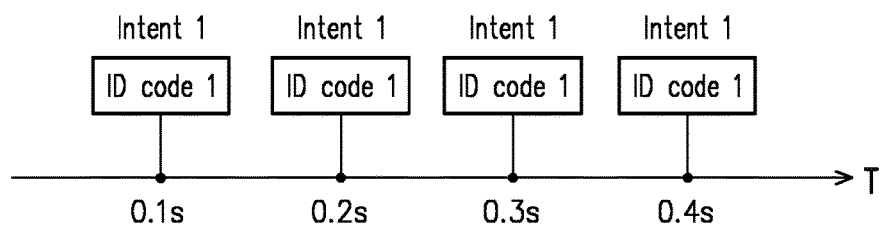
FIGS. 4A and 4B are examples illustrating intent contents.
Figure 4B:
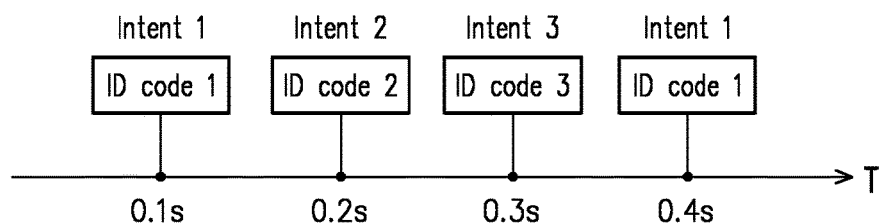

In addition, there may be multiple transmitting mechanisms. In one embodiment, refereeing to FIG. 4A, the identification (ID) code transmitted by the transmitting apparatus 110 would be the same every time. The transmitting apparatus 110 broadcasts identification (ID) code 1 every 0.1 second. However, in another embodiment, refereeing to FIG. 4B, multiple ID codes would be transmitted. The transmitting apparatus 110 broadcasts ID code 1 first, broadcasts ID code 2 subsequently, and so on. In still another embodiment, one broadcasting message may include multiple different ID codes. It means that, the receiver 131 may receive the broadcasting message including a second identification code different from the identification code or receives a second broadcasting message including the second identification code. Accordingly, comparing with embodiment of FIG. 4A, if one transmitting apparatus 110 can broadcast more than one identification codes, more information can be broadcasted, so that the number of the transmitting apparatuses 110 in a single area can be reduced greatly. It should be noticed that, the frequency and power to transmit the broadcasting message can be modified based on actual requirements, and the embodiments of the disclosure are not limited thereto.

In response to the receiver 131 of the receiving apparatus 130 receiving the broadcasting message from the transmitting apparatus 110, the processor 135 may parse the broadcasting message and obtain the identification code contained in the broadcasting message. Then, the processor 135 forwards the identification code to the database 150 (Step S330).

The processor of the database 150 or the processor 135 would search one or more intent contents according to the identification code stored in the database 150. In this embodiment, the database 150 records relations between identification codes and intent contents. The identification codes could be numbers, text, or a combination of both. The intent contents could be webpage requests (e.g., hypertext transfer protocol (HTTP)/hypertext transfer protocol secure (HTTPS) request), a string, a drawing, a video data, an audio data, a programming code, or a combination of aforementioned contents. The relations between identification codes and intent contents may be recorded as a look-up table, or other forms. The processor of the database 150 or the processor 135 would search whether the same received identification code is recorded in the look-up table and obtain the corresponding intent content.

For example, table (1) is an example of a look-up table. If the identification code received from the transmitting apparatus 110 were "1234", the database 150 would obtain the intent content "Notify 1".

TABLE (1)

| Identification code | Intent content |
| --- | --- |
| 1234 | Notify 1 |
| 5678 | Notify 2 |
| . . . | . . . |

In response to obtaining corresponding intent content, the database 150 may provide the obtained intent content corresponding the identification code without an application identification (Step S350). It should be noticed that, in conventional iBeacon transmitting mechanism, a server would feedback intent content with an application identification, the application identification would make the OS of the receiving apparatus 130 invoke the corresponding application according to the application identification (referred to as the application, such as Facebook, twitter, eBay, or the like), so as to display a push notification by the corresponding application. The application identification is registered in the database 150, to correspond to one or more identification codes. In the embodiment of the disclosure, the processor 135 monitors the broadcasting message through the OS by the receiver 131 without an application. It means that, the OS of the receiving apparatus 130 can parse the broadcasting message, and a specific application corresponding to an application identification registered with an identification code would not need to be installed or executed. On the other hand, the database 150 would disable appending the application identification with the intent content, so that the application identification would not be fed back to the receiving apparatus 130.

In response to the processor 135 obtaining the intent content from the database 150, the processor 135 can present a notification according to the intent content by the OS through the presenting device 133 without opening the application corresponding to the application identification obtaining the intent content (Step S370). In this embodiment, because receiving apparatus 130 would not receive the application identification, the OS of the receiving apparatus 130 would not need to invoke the application corresponding to the application identification to receive the intent content.

For example, the processor 135 may disable opening the application corresponding to the application identification. Alternatively, the application corresponding to the application identification may not be installed in the receiving apparatus 130.

Figure 5:
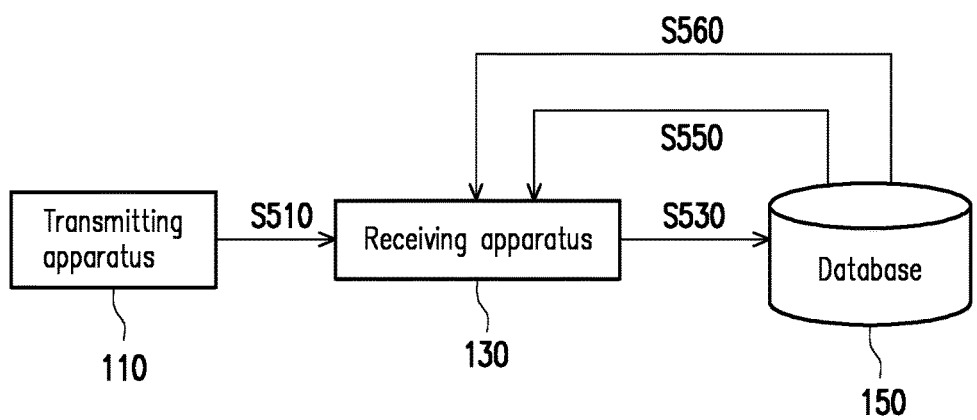
FIG. 5 is a flowchart illustrating providing intent contents with different push times according to one of the exemplary embodiments of the disclosure.

In addition, the receiving apparatus 130 may receive more than one identification code from one or more transmitting apparatus 110, and the database 150 may further record relations between the identification code and push times. For example, referring to FIG. 5, the receiving apparatus 130 receive a first identification code and a second identification code from the transmitting apparatus 110 at same time or different times (Step S510). The receiving apparatus 130 forwards the first and second identification codes to the database 150 (Step S530). Table (2) is an example of a look-up table stored in the database 150.

TABLE (2)

| Identification code | Intent content | Push time |
|---|---|---|
| 1234 | Notify_1 | T1 |
| 3456 | Notify_2 | T2 |
| 5678 | ... | ... |

The look-up table records that the first identification code "1234" corresponds to a first push time T1, and the second identification code "3456" corresponds to a second push time T2 different from the push time T1. It assumed that the first push time T1 is earlier than the second push time T2. The database 150 would provide the intent content corresponding to the first identification code when the first push times T1 is expired (Step S550). Then, the database 150 would provide the intent content corresponding to the second identification code when the second push times T2 is expired (Step S560) and the intent content corresponding to the first identification code has been provided. In other words, the receiving apparatus 130 obtains the intent content corresponding to the first identification code and the second identification code according to the first push time and the second push time, respectively. Accordingly, multiple intent contents could be scheduled, and the receiving apparatus 130 can receive these intent contents at different times. Even if one broadcasting message includes more than one identification code or more than one identification code are received from multiple transmitting apparatuses 110, the transmissions of corresponding intent contents can be scheduled, respectively.

It should be noticed that, the OS can directly parse the broadcasting message and obtain the intent content in the afore-mentioned embodiments. In another embodiment, the broadcasting message may further include a service enabling indication. In response to receiving the service enabling indication, the processor 150 activates a push service according to the service enabling indication, to monitor a push message from the database 150. After the receiving apparatus 130 forwards an identification code contained in the broadcasting message, the database 150 may provide the push message including an intent content corresponding to the identification code.

Furthermore, if the presenting device 133 is a display, there are multiple presenting manners for the notification displayed on the presenting device 133. For example, FIG. 6A-6E are examples illustrating different types of notifications. Referring to FIG. 6A, a normal notification 610 includes text and thumbnail of drawing displayed on the top of the display 133. Referring to FIG. 6B, comparing with the normal notification, a drawing notification 620 includes larger drawing to emphasize the content of the drawing. Referring to FIG. 6C, a full-screen notification 630 would cover the entire screen on the display 133. Referring to 6D, an intent content may further specify an application. The processor 150 may invoke the specified application to display an application notification 640 at a specified page. Referring to FIG. 6E, another application notification 650 may be displayed on the top of the display 133 and performed by the specified application.

It should be noticed that, those drawings shown in FIGS. 6A-6C and 6E could be replaced by videos or other vision-related data. In still another embodiment, if the presenting device 133 is a speaker, the presenting device 133 can play an advertising music, a slogan, a speech, or other audition-related data.

The disclosure also provides a non-transitory computer readable recording medium, which records a computer program to be loaded into a processor to execute the steps of the proposed method. The computer program is composed of a plurality of program instructions (e.g. an organization chart, establishing program instruction, a table approving program instruction, a setting program instruction, and a deployment program instruction). Once the program sections are loaded into the processor and executed by the same, the steps of the proposed receiving method would be accomplished.

In summary, the exemplary embodiments described above depicted a message transmission system, a receiving apparatus, a receiving method and a computer-readable recording medium thereof. In the embodiments of the disclosure, the receiving apparatus would not need to be installed with an application to receive push notification, and the efficiency of push notification can be improved. Comparing with the conventional manner, at least three steps are omitted in the embodiments of the disclosure, and more receiving apparatuses can receive the push notification. In addition, one transmitting apparatus may provide more than one identification code, so that the receiving apparatus can obtain more intent contents. Comparing with the conventional manner providing one identification code from one transmitting apparatus, the number of transmitting apparatus disposed in the same area can be reduced greatly.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A message transmission system, comprising:
 a transmitting apparatus, transmitting a broadcasting message, wherein the broadcasting message comprises an identification code;
 a receiving apparatus, forwarding the identification code in response to receiving the broadcasting message; and
 a database, providing an intent content corresponding to the identification code without an application identification, wherein
 the receiving apparatus presents a notification according to the intent content by an operation system (OS) without opening an application corresponding to the application identification in response to receiving the intent content.

2. The message transmission system according to claim 1, wherein the database disables appending the application identification with the intent content, and the application identification corresponds to the identification code.

3. The message transmission system according to claim 1, wherein the OS monitors the broadcasting message without the application.

4. The message transmission system according to claim 1, wherein the transmitting apparatus transmits the broadcasting message comprising a second identification code different from the identification code or transmits a second broadcasting message comprising the second identification code.

5. The message transmission system according to claim 4, wherein the identification code corresponds to a push time, the second identification code corresponds to a second push time different from the push time, and the database provides the intent content corresponding to the identification code and the second identification code according to the push time and the second push time, respectively.

6. The message transmission system according to claim 1, wherein the broadcasting message further comprises a service enabling indication, and the receiving apparatus activates a push service according to the service enabling indication to monitoring a push message from the database, wherein the push message comprises the intent content.

7. The message transmission system according to claim 1, wherein the transmitting apparatus communicates with the receiving apparatus through Bluetooth, Wi-Fi, infrared radiation (IR), or long range (LoRa).

8. A receiving apparatus, comprising:
a receiver, receiving a broadcasting message, wherein the broadcasting message comprises an identification code;
a presenting device;
a processor, coupled to the receiver and the presenting device, and configured for:
forwarding the identification code to a database in response to receiving the broadcasting message;
obtaining an intent content corresponding to the identification code without an application identification from the database; and
presenting a notification according to the intent content by an operation system (OS) through the presenting device without opening an application corresponding to the application identification in response to obtaining the intent content.

9. The receiving apparatus according to claim 8, wherein the processor monitors the broadcasting message through the OS without the application, and the application identification corresponds to the identification code.

10. The receiving apparatus according to claim 8, wherein the receiver receives the broadcasting message comprising a second identification code different from the identification code or receives a second broadcasting message comprising the second identification code.

11. The receiving apparatus according to claim 10, wherein the identification code corresponds to a push time, the second identification code corresponds to a second push time different from the push time, and the processor obtains the intent content corresponding to the identification code and the second identification code according to the push time and the second push time, respectively.

12. The receiving apparatus according to claim 8, wherein the broadcasting message further comprises a service enabling indication, and the processor activates a push service according to the service enabling indication, to monitor a push message from the database, wherein the push message comprises the intent content.

13. The receiving apparatus according to claim 8, wherein the receiver receives the broadcasting message through Bluetooth, Wi-Fi, infrared radiation (IR), or long range (LoRa).

14. A receiving method, adapted for a receiving apparatus, the receiving method comprising:
receiving a broadcasting message, wherein the broadcasting message comprises an identification code;
forwarding the identification code to a database in response to receiving the broadcasting message;
obtaining an intent content corresponding to the identification code without an application identification from the database; and
presenting a notification according to the intent content by an operation system (OS) without opening an application corresponding to the application identification in response to obtaining the intent content.

15. The receiving method according to claim 14, wherein the step of obtaining the intent content corresponding to the identification code without an application identification from the database comprises:
monitoring the broadcasting message through the OS without the application, wherein the application identification corresponds to the identification code.

16. The receiving method according to claim 14, wherein the step of receiving a broadcasting message comprises:
receiving the broadcasting message comprising a second identification code different from the identification code or receiving a second broadcasting message comprising the second identification code.

17. The receiving method according to claim 16, wherein the identification code corresponds to a push time, the second identification code corresponds to a second push time different from the push time, and the step of obtaining the intent content comprises:
obtaining the intent content corresponding to the identification code and the second identification code according to the push time and the second push time, respectively.

18. The receiving method according to claim 14, wherein the broadcasting message further comprises a service enabling indication, and the step of obtaining the intent content comprises:
activating a push service according to the service enabling indication, to monitor a push message from the database, wherein the push message comprises the intent content.

19. The receiving method according to claim 14, wherein the step of receiving a broadcasting message comprises:
receiving the broadcasting message through Bluetooth, Wi-Fi, infrared radiation (IR), or long range (LoRa).

20. A non-transitory computer-readable recording medium for recording a program code configured to be loaded by a processor of a receiving apparatus to execute steps of:
receiving a broadcasting message, wherein the broadcasting message comprises an identification code;
forwarding the identification code to a database in response to receiving the broadcasting message;
obtaining a intent content corresponding to the identification code without an application identification from the database; and
presenting a notification according to the intent content by an operation system (OS) without opening an application corresponding to the application identification in response to obtaining the intent content.

* * * * *